US011122045B2

(12) United States Patent
Serban et al.

(10) Patent No.: US 11,122,045 B2
(45) Date of Patent: Sep. 14, 2021

(54) AUTHENTICATION USING CREDENTIALS SUBMITTED VIA A USER PREMISES DEVICE

(71) Applicant: AT&T Intellectual Property I, L.P., Atlanta, GA (US)

(72) Inventors: Cristina Serban, Middletown, NJ (US); Wei Wang, Weehawken, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 66 days.

(21) Appl. No.: 16/429,643

(22) Filed: Jun. 3, 2019

(65) Prior Publication Data
US 2019/0289008 A1    Sep. 19, 2019

Related U.S. Application Data

(63) Continuation of application No. 15/436,731, filed on Feb. 17, 2017, now Pat. No. 10,356,096.

(51) Int. Cl.
*H04L 29/06* (2006.01)
*G06F 21/32* (2013.01)

(52) U.S. Cl.
CPC .............. *H04L 63/10* (2013.01); *G06F 21/32* (2013.01); *H04L 63/0861* (2013.01); *H04L 63/1458* (2013.01); *H04L 2463/082* (2013.01)

(58) Field of Classification Search
None
See application file for complete search history.

(56) References Cited

U.S. PATENT DOCUMENTS

| 7,024,556 | B1* | 4/2006 | Hadjinikitas | ....... H04L 63/0815 709/225 |
| 7,685,629 | B1 | 3/2010 | White et al. | |
| 7,961,674 | B2* | 6/2011 | Jing | .................... H04W 12/041 370/328 |
| 8,347,079 | B2 | 1/2013 | Cho et al. | |
| 8,763,097 | B2 | 6/2014 | Bhatnagar et al. | |
| 8,856,892 | B2 | 10/2014 | Faludi | |
| 8,955,076 | B1* | 2/2015 | Faibish | ................. H04L 63/108 726/7 |

(Continued)

OTHER PUBLICATIONS

Nagaraju et al., "Robust Multi-Factor Authentication Machanism for Enterprises in Cloud Computing", International Innovative Research Journal of Engineering and Technology, Melange Publications, vol. 2, No. 1, Sep. 2016, 11 pages.

(Continued)

*Primary Examiner* — Michael W Chao
(74) *Attorney, Agent, or Firm* — Amin, Turocy & Watson, LLP

(57) ABSTRACT

An authentication system can be operable to receive from a user premises device credentials associated with a user identity, wherein the user premises device can also be operable to monitor and control a premise of the user identity. The authentication system can process the credentials and transmit an authentication verification to an on-line system to enable access to the on-line system by a user equipment of the user identity. The authentication system can be used as a factor (or additional factor) of authentication, for example, to gain sooner access to an on-line system that has locked out a user identity in response to a personal denial of service (PDoS) attack.

20 Claims, 12 Drawing Sheets

(56) References Cited

U.S. PATENT DOCUMENTS

| | | | |
|---|---|---|---|
| 9,264,423 B2 | 2/2016 | Cox | |
| 9,294,476 B1 | 3/2016 | Lurey et al. | |
| 9,497,210 B2 | 11/2016 | Weiss et al. | |
| 9,674,700 B2* | 6/2017 | John Archibald | H04W 12/06 |
| 9,791,843 B1* | 10/2017 | Reiser | G05B 19/00 |
| 10,060,644 B2* | 8/2018 | Bruhn | H04N 21/4131 |
| 10,187,745 B1 | 1/2019 | Zhao | |
| 10,326,678 B2* | 6/2019 | Frei | G08B 25/01 |
| 10,762,772 B2* | 9/2020 | Tannenbaum | G07C 9/00 |
| 10,791,121 B1* | 9/2020 | Jakobsson | G06F 21/00 |
| 10,798,570 B2* | 10/2020 | Feng | H04L 63/0853 |
| 2001/0001877 A1* | 5/2001 | French | G06Q 20/40 713/182 |
| 2003/0061503 A1* | 3/2003 | Katz | H04W 12/06 726/4 |
| 2005/0188193 A1* | 8/2005 | Kuehnel | H04L 63/083 713/155 |
| 2006/0291455 A1* | 12/2006 | Katz | H04W 12/068 370/355 |
| 2008/0109889 A1* | 5/2008 | Bartels | H04L 63/10 726/7 |
| 2010/0189011 A1* | 7/2010 | Jing | H04L 63/1458 370/254 |
| 2011/0015797 A1* | 1/2011 | Gilstrap | G05B 15/02 700/291 |
| 2011/0162051 A1 | 6/2011 | Li et al. | |
| 2011/0311052 A1* | 12/2011 | Myers | G07C 9/20 380/270 |
| 2013/0219481 A1 | 8/2013 | Voltz | |
| 2014/0189807 A1 | 7/2014 | Cahill et al. | |
| 2014/0230018 A1 | 8/2014 | Anantharaman | |
| 2014/0245396 A1* | 8/2014 | Oberheide | H04L 63/18 726/4 |
| 2014/0273963 A1 | 9/2014 | Su et al. | |
| 2014/0366128 A1 | 12/2014 | Venkateswaran et al. | |
| 2015/0033305 A1 | 1/2015 | Shear et al. | |
| 2015/0150122 A1* | 5/2015 | Son | G06F 21/32 726/20 |
| 2015/0177842 A1 | 6/2015 | Rudenko | |
| 2015/0296378 A1* | 10/2015 | Plestid | H04L 63/18 455/411 |
| 2015/0347114 A1 | 12/2015 | Yoon | |
| 2015/0363582 A1 | 12/2015 | Sheller et al. | |
| 2015/0365400 A1* | 12/2015 | Cox | H04L 63/18 726/7 |
| 2016/0005038 A1 | 1/2016 | Kamal et al. | |
| 2016/0048705 A1* | 2/2016 | Yang | G06F 21/35 726/34 |
| 2016/0112386 A1* | 4/2016 | Park | H04W 12/04031 713/171 |
| 2016/0188870 A1* | 6/2016 | Sun | G06F 21/45 726/18 |
| 2016/0275283 A1* | 9/2016 | de Leon | G06F 3/04883 |
| 2016/0284207 A1* | 9/2016 | Hou | H04L 63/0853 |
| 2016/0285904 A1 | 9/2016 | Ye et al. | |
| 2016/0330172 A1 | 11/2016 | Muttik | |
| 2016/0359864 A1* | 12/2016 | Dhaliwal | H04W 12/08 |
| 2017/0118640 A1* | 4/2017 | Lee | H04W 12/06 |
| 2017/0140376 A1* | 5/2017 | Carraway | H04L 51/36 |
| 2017/0142589 A1* | 5/2017 | Park | H04L 63/0853 |
| 2017/0192402 A1* | 7/2017 | Karp | F24F 11/30 |
| 2017/0244692 A1* | 8/2017 | Bhupathiraju | H04L 63/18 |
| 2017/0359339 A1* | 12/2017 | Hevizi | H04B 17/318 |
| 2017/0359723 A1* | 12/2017 | Pal | H04L 63/18 |
| 2018/0069853 A1* | 3/2018 | Adams | G06F 21/31 |
| 2018/0191695 A1* | 7/2018 | Lindemann | H04L 63/0853 |
| 2019/0079476 A1* | 3/2019 | Funes | G06N 5/047 |
| 2020/0296585 A1* | 9/2020 | Bolotin | H04L 63/0861 |

OTHER PUBLICATIONS

Non-Final Office Action received for U.S. Appl. No. 15/436,731 dated Oct. 30, 2018, 33 pages.
Notice of Allowance received for U.S. Appl. No. 15/436,731 dated Mar. 4, 2019, 17 pages.

* cited by examiner

AUTHENTICATION USING CREDENTIALS SUBMITTED VIA A USER PREMISES DEVICE

RELATED APPLICATION

The subject patent application is a continuation of, and claims priority to, U.S. patent application Ser. No. 15/436,731, filed Feb. 17, 2017, and entitled "AUTHENTICATION USING CREDENTIALS SUBMITTED VIA A USER PREMISES DEVICE," the entirety of which application is hereby incorporated by reference herein.

TECHNICAL FIELD

The present application relates generally to the field of data processing and more specifically to user authentication in network security, e.g., authentication using credentials submitted via a user premises device.

BACKGROUND

Secured access to networks and systems is an increasing challenge to both consumers and those who supply goods or services to users on-line. A large number of on-line services and websites request that a user authenticate themselves to log into a system, and thereafter be able to access services or buy products that the user is authorized to use or purchase. Traditional user authentication typically requires only a username (e.g., user login) and one authentication factor (e.g., a password) to gain access to an on-line system. Because usernames and passwords have varying rules and requirements, a user is typically tasked with remembering a variety of usernames and passwords. With the number of online services the typical user accesses, the recollection of which combination was used for which on-line system becomes cumbersome and problematic.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
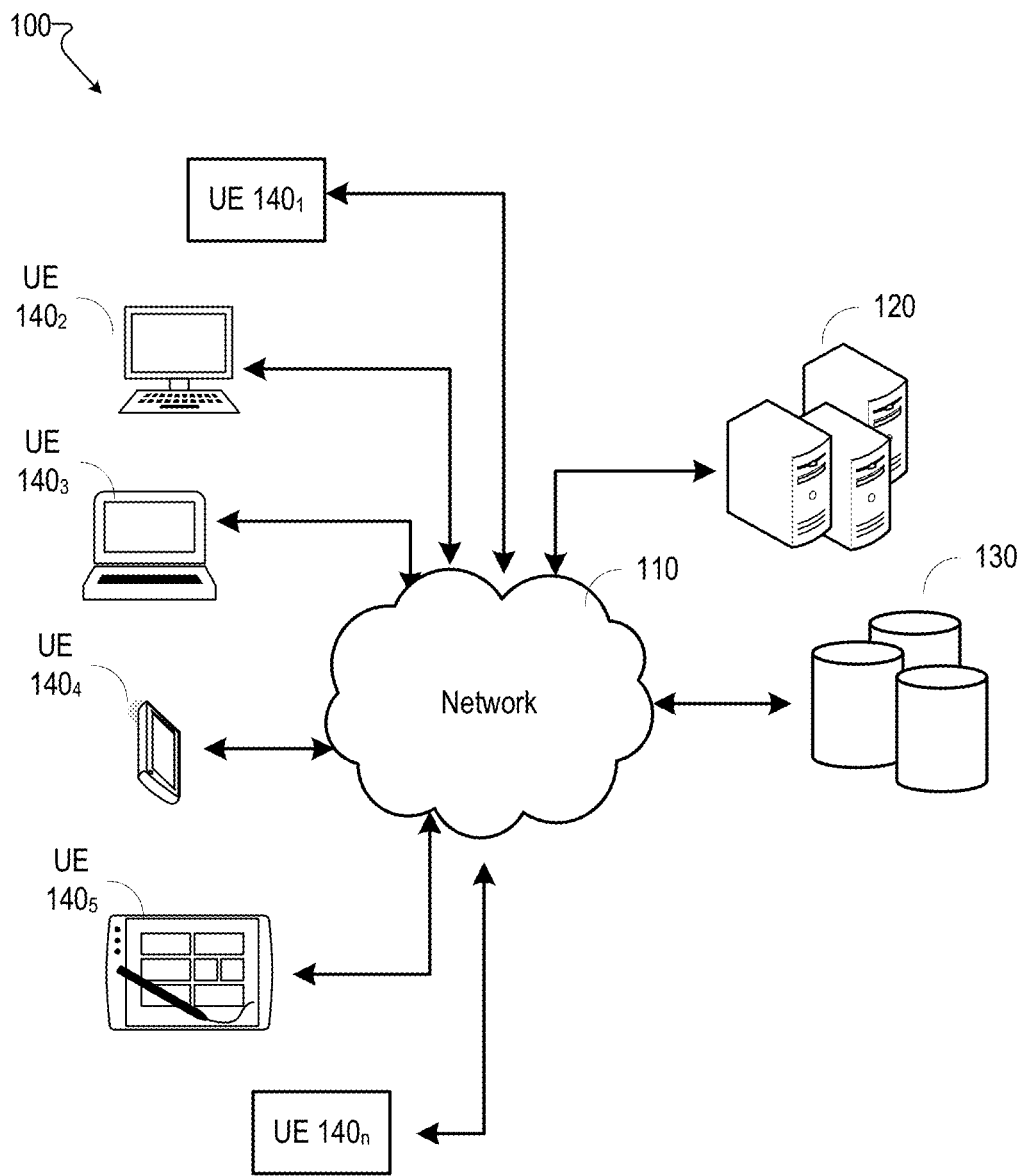
FIG. 1 is a block diagram illustrating an example system and networking environment for accessing on-line services and products.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure can be practiced without these specific details. In other instances, well-known structures and devices are shown in block diagram form in order to facilitate describing the subject disclosure.

The subject disclosure of the present application describes systems and methods (comprising example computer processing systems, computer-implemented methods, apparatus, computer program products, etc.) for accessing an on-line system. The methods (e.g., processes and logic flows) described in this specification can be performed by devices comprising programmable processors that execute machine-executable instructions to facilitate performance of the operations described herein. Examples of such devices can be as described in FIG. 1, and can comprise circuitry and components as described in FIG. 14 and FIG. 15. Example embodiments may take the form of an entirely hardware embodiment, an entirely software embodiment, or an embodiment combining software and hardware aspects.

Example embodiments are described below with reference to block diagrams and flowchart illustrations of methods, apparatuses, and computer program products. Steps of the block diagrams and flowchart illustrations support combinations of mechanisms for performing the specified functions, combinations of steps for performing the specified functions, and program instructions for performing the specified functions. Example embodiments may take the form of web, mobile, wearable computer-implemented, computer software. It should be understood that each step of the block diagrams and flowchart illustrations, combinations of steps in the block diagrams and flowchart illustrations, or any functions, methods, and processes described herein, can be implemented by a computer executing computer program instructions. These computer program instructions may be loaded onto a general-purpose computer, special purpose computer, combinations of special purpose hardware and other hardware, or other programmable data processing apparatus. Example embodiments may take the form of a computer program product stored on a computer-readable storage medium having computer-readable instructions (e.g., software) embodied in the storage medium. Any suitable computer-readable storage medium may be utilized including, for example, hard disks, compact disks, DVDs, optical data stores, and/or magnetic data stores.

Users who do not remember a password typically request a password reset (or temporary password), for example, by clicking on a link indicating that the user has lost, or forgotten their password. The system that the user is attempting to access may send the user an email to an email address that was provided to the system by the user with instructions relating to resetting the password. The user might also be prompted to enter one or more pieces of authenticating information (e.g., something the user knows, such as their birthplace, mother's maiden name, favorite pet, etc.) in order to access the system again.

Another security measure implemented by many systems comprises a system lockout, e.g., to protect against a dictionary attack where a malicious piece of external code systematically tries every length and combination of characters in existence until the correct password is finally tried. When a user (or some other identity, such as a hacker or automated hacking system) attempts to access a system with a user's username and different password entries (typically, attempts to guess the user's password), the system may respond by locking the user out for a period of time (e.g., for an hour, several hours, a day, etc.). In such a situation, regardless of whether it was the user attempted to log in or someone else, the user might be requested to wait a certain amount of time.

A growing trend has been the increase of personal denial of service (PDoS) attacks based on this time-out response by a system. In a traditional denial of Service (DoS) attack, a hacker runs a program that inundates a specific IP address (e.g., system) with so many requests that the system can no longer respond. Since routers can't always distinguish between the legitimate and illegitimate requests, the entire system can be brought to a standstill. In a PDoS attack, a malicious wrong-doer repeatedly enters the correct username but incorrect password to elicit the time-out response from a particular system that the wrong-doer knows that user must access in order to accomplish a particular task or transaction through the system. The delay in access to the system might be enough to prevent the user from accomplishing time-sensitive tasks. PDoS attacks might be used, for example, to prevent users from login in to play on-line games, access on-line music or movies, completing a homework assignment, or making a bid for an auctioned item.

The present application describes systems and methods for using a user premises device, wherein the user premises device is operable to monitor and control a premises of a user identity, is associated with the user identity (e.g., registered to the user identity, or contains one or more usernames associated with the user identity), and located within the premises. The premises can be a residential, business or other location, that is physically secured (e.g., by lock and key, or a security system such as an alarm system).

Figure 10:
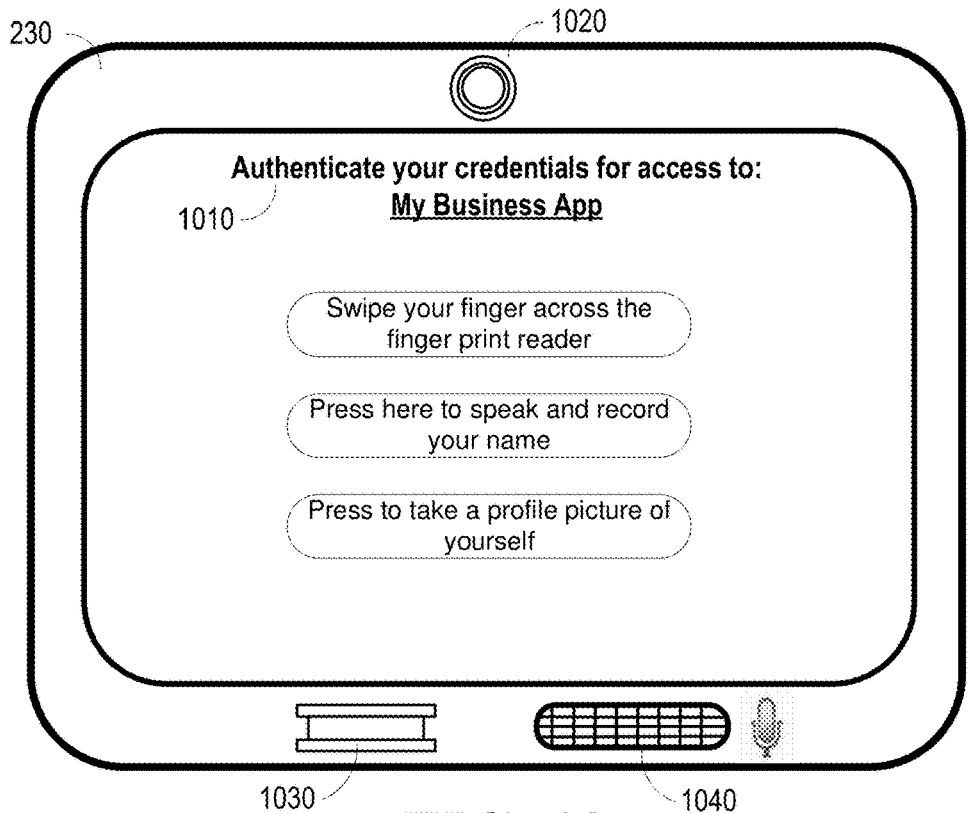
FIGS. 10-11 also illustrate an example user premises device generating displays in accordance with various aspects and embodiments of the subject disclosure.

The user premises device can be used to obtain a credential (or credentials) related to a physical quality of the user identity, to facilitate authentication for access to an on-line system (e.g., a website) for providing services or products, for example, when a user has been denied access to the on-line system due to multiple unsuccessful login attempts (e.g., from a PDoS attack). The user premises device can be, for example, a computing device comprising a console operable for controlling, for example, a lighting network, a physical security network of the premises (e.g., an alarm system), or a temperature control network (e.g., a thermostat). In example embodiments, the authentication system (e.g., provided via an authentication server) can receive a request for access to the on-line system that the user identity is locked out from the on-line system. The request can be received, for example, from the user premises device. The user premises device can generate a prompt to input the credential to gain access to the on-line system (e.g., a prompt such as "Authenticate your credentials for access to the website MyBusinessApp.com"). An example of a GUI that shows this prompt is shown in FIG. 10. The user premises device can comprise one or more input devices for obtaining the credential or credentials (e.g., a camera for obtaining a photograph, a fingerprint reader for obtaining fingerprints, a microphone for obtaining a voice print). The one or more input devices can be physically integrated with the user premise device (as shown in FIG. 10), or can be peripherally connected to the user premises device (e.g., wired or wirelessly).

After a user identity has input the credential (or credentials), the user premises device can transmit the credential to the authentication system. The authentication system can receive the credential and compare this credential with a credential related to the quality of the user identity obtained from a memory accessible by the authentication system (e.g., compare the fingerprint of the user identity received from the user premises device with a fingerprint of the user identity obtained from memory), wherein the credential stored in the memory was obtained prior to the receipt of the credential subsequently obtained from the user premises device).

In response to the credential being determined to match the credential previously obtained and stored in memory, the authentication system can transmit an authentication verification to the on-line system, which, upon receipt and processing, can enable access to the on-line system by the user through a user equipment (e.g., a personal computer).

Figure 12:
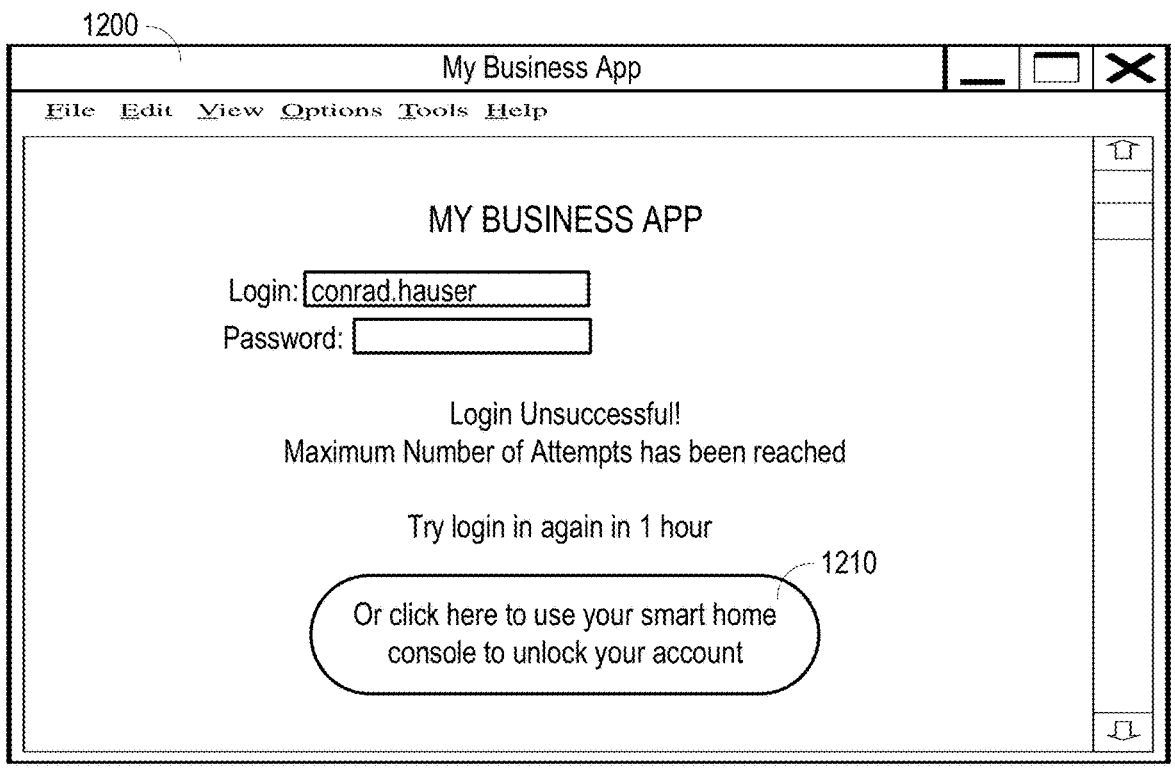
FIGS. 12-13 illustrates another example of a graphical user interface (GUI) of a login screen in which access to an on-line system has been denied.

In other example embodiments, a user identity attempting to login to an on-line system through his/her computing device might see a message generated by the on-line system indicating that the user can initiate a request to access the system by using a user premises device located within a premises of the user identity. The message can be generated in response to the presence of a condition in which the on-line system is preventing access from the user based on repeated unsuccessful attempts to log in using the user's username A GUI button can be displayed to the user asking the user to submit the request (e.g., a button displaying the caption, "click here to use your smart home device to unlock your account."). An example of this display is shown in FIG. 12. Once a request has been transmitted, the on-line system can be operable to forward the user request for access to the on-line system to an authentication system. The user request can comprise information identifying the user account of the on-line system.

The authentication system can then send a signal to the user premises device to prompt the user to input a credential related to a physical quality of the user identity (e.g., photo, fingerprint, voice print, etc.). After a user identity has input the credential (or credentials), the user premises device can transmit the credential to the authentication system. The authentication system can receive the credential and compare this credential with a credential related to the quality of the user identity obtained from a memory accessible by the authentication system (e.g., compare the fingerprint of the user identity received from the user premises device with a fingerprint of the user identity obtained from memory), wherein the credential stored in the memory was obtained prior to the receipt of the credential subsequently obtained from the user premises device).

In response to the credential being determined to match the credential previously obtained and stored in memory, the authentication system can transmit an authentication verification to the on-line system, which, upon receipt and processing, can enable access to the on-line system by the user through a user equipment (e.g., a personal computer).

The authentication system and methods described can also be used for identity attestation even without the presence of attacks. As an example, authentication through the user premises device can be used as an extra factor for authentication for critical or valuable accounts (e.g., banking, financial). The authentication system and methods described can also facilitate authentication for e-learning (e.g., for admitting at-home students to closed classrooms, lectures, etc., identity checking for on-line exams and certifications, relaying authenticated test and certification results, etc.).

FIG. 1 is a diagram illustrating an example of an environment 100 in which user equipment can access on-line services provided through one or more server devices having access to one or more data stores. According to example embodiments, a system 100 in accordance with the present application can comprise one or more servers and user equipment that execute software modules (as described above) that can facilitate various functions, methods, and processes. As may be understood from this figure, the system 100 can comprise one or more computer networks 110, one or more servers 120, one or more data stores 130 (which may contain one or more databases of information), and one or more user equipment ("UE") 140. UE 140 can comprise, for example, a tablet computer, a desktop computer, or laptop computer, a cellular enabled laptop (e.g., comprising a broadband adapter), a handheld computing device, a mobile phone, a smartphone, a tablet computer, a wearable device, a virtual reality (VR) device, a heads-up display (HUD) device, an "internet of things" (IoT) device and the like. In example embodiments, modules comprising executable instructions that, when executed by a processor of the UE 140, facilitate performance of operations, can be stored on a memory device of the UE 140 (or a memory device connected to the UE 140).

In example embodiments, a user device (e.g., UE 140) running a webpage can access and communicate, through one or more communications networks (e.g., network 110), with one or more servers (e.g., servers 120). In example embodiments, modules comprising executable instructions that, when executed by a processor of the server 120, facilitate performance of operations, can be stored on a memory device of the server 120 (or a memory device connected to the server). The servers 120 can also be operable to send executable code capable of generating graphical user interfaces (GUIs) that a user identity can interact with to facilitate the provision of such on-line products and services.

The servers 120 can be operable to provide for an on-line system that allows a user identity to access on-line services and purchase products. On-line services and products can be of any type, such as, for example, academic services (e.g., on-line registration for classes, submission of assignments, on-line exams, etc.), financial services (e.g., bill payment for utilities, on-line banking, sale and purchasing of commodities, etc.), consumer products (e.g., merchant identities selling merchandise on-line, on-line auction sites), travel services, government services, on-line gaming services, etc.

The one or more computer networks 110 may include any of a variety of types of wired or wireless computer networks such as the Internet, a private intranet, a public switched telephone network (PSTN), cellular network, satellite network, data over cable network (e.g., operating under one or more data over cable service interface specification "DOCSIS"), or any other type of computer or communications network. The communications networks can also comprise, for example, a Local Area Network (LAN), such as an office or Wi-Fi network.

Servers 120, data stores 130, and UE 140, may be physically located in (or in the case of mobile devices, can be temporarily present in) a central location, or in separate facilities. The data stores can comprise physical media housed within the one or more servers 120, or connected to the servers 120 through one or more networks. In example embodiments, the one or more computer networks 110 facilitate communication between the server(s) 120, data store(s) 130, and UE 140.

Figure 2:
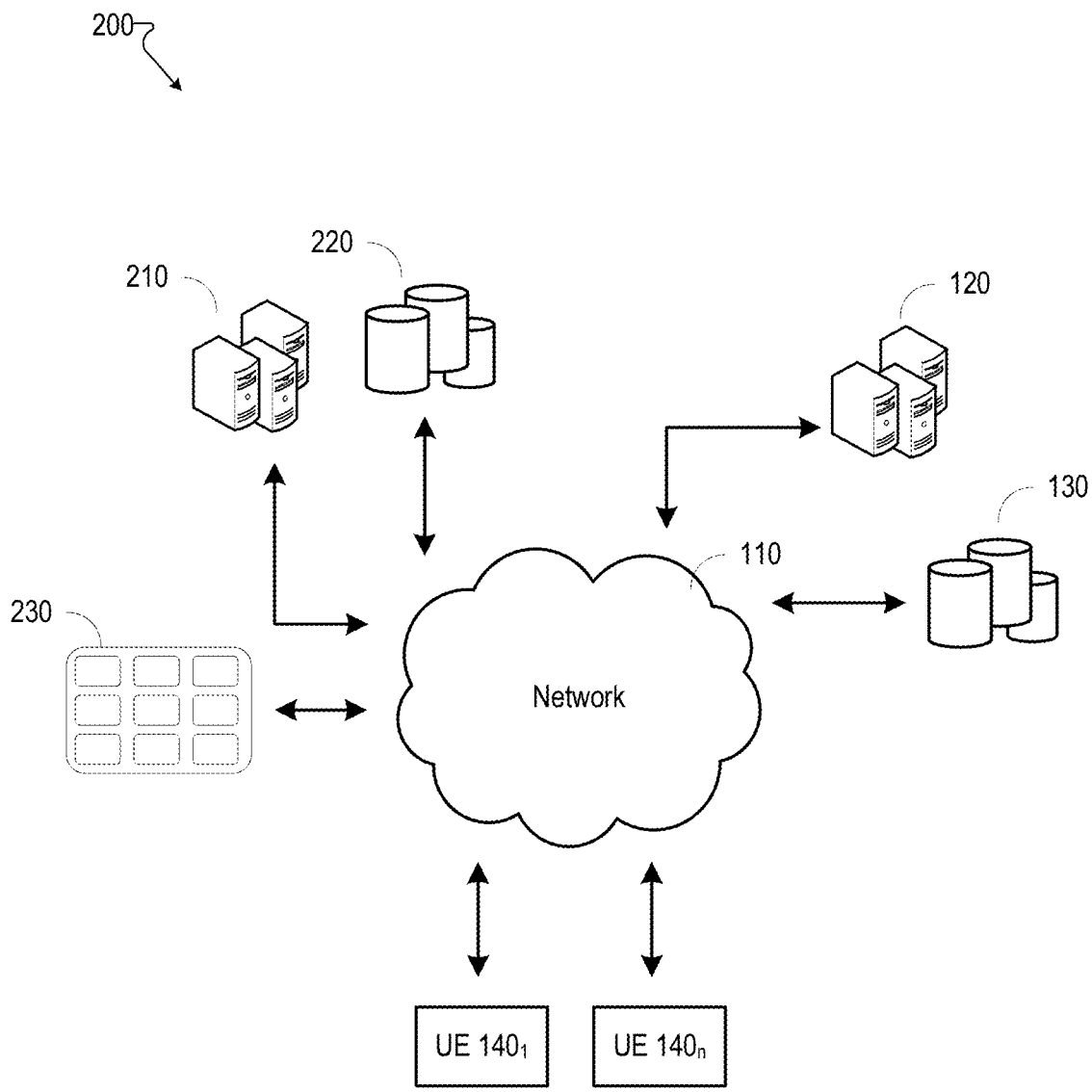
FIG. 2 is a block diagram illustrating an example system and networking environment in which access to an on-line system can be facilitated through the user of a user premises device and an authentication server.

FIG. 2 is a diagram illustrating an example networking environment 200 showing servers and a user premises device for performing the methods and functions herein. In FIG. 2, a user identity using a user equipment (e.g., UE 140), can access an on-line system (e.g., an on-line system comprising one or more servers 120 executing software modules, and transmitting modules to be executed by a user equipment) providing on-line services or products.

Still referring to FIG. 2, in accordance with this application, a server (or one or more servers) that is operable to authenticate a user for access to an on-line system provided, for example, by server 120, using credentials received from a user premises device (authentication server 210) is provided. The server can access and run stored (e.g., stored on a memory, stored on a machine-readable medium, etc.) executable instructions that, when executed by a processor of the server, facilitate performance of operations described herein. Server 200 can be connected to one or more data stores 220 for storing information (e.g., information such as user identity credentials). The data stores can be local data stores (e.g., within the physical housing of server 210), a peripheral data store (e.g., a peripheral hard drive), or a networked data store (e.g. a cloud storage device). In example embodiments, the authentication server 210 can receive a credential related to a physical quality of a user identity, and in response to the credential being determined to match a credential related to a credential related to the quality that was previously obtained and stored in memory (e.g., stored in data store 220), transmit an authentication verification to server 120, which, upon receipt and processing, can enable access by the user identity to the on-line system of the server 120 (e.g., access the on-line system through a user equipment (e.g., a personal computer)).

The server 210 can be operable to communicate with a user premises device 230 that can comprise a computing device operable to monitor and control a premises of a user identity. The user premises device can access and run stored (e.g., stored on a memory, stored on a machine-readable medium, etc.) executable instructions that, when executed by a processor of the server, facilitate performance of operations described herein. Devices that can monitor and control a premises have been referred to as "smart home devices," "smart home consoles," "smart home controllers," "smart home hubs," and "home automation hubs." Such devices provide a central device that can be used, for example, to adjust the lighting in a premises, monitor and control the temperature in a premises, or control an alarm system of the premises. The user premises device can thus be connected to a variety of IoT devices, which can comprise thermostats, light bulbs, door locks, refrigerators and other home appliances, etc.

Figure 3:
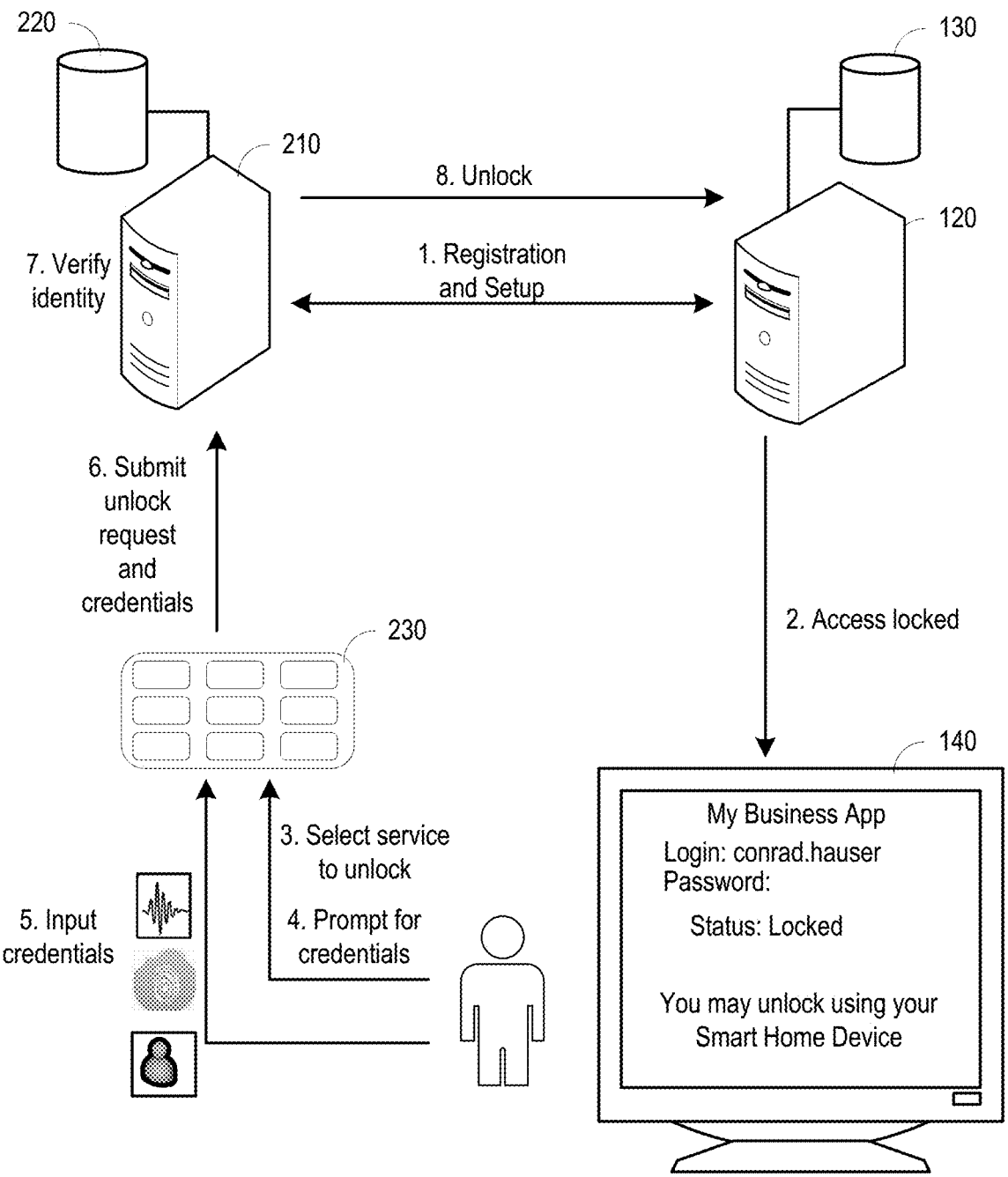
FIGS. 3-4 are a block diagrams providing an overview of methods and processes (e.g., transactions) of the present application.

The user premises device 230 of the present application can also comprise a user input device capable of obtaining a credential related to a physical quality of the user identity. The user input device can be integrated with the user premise device 230, or can be a peripheral device. The user input device can enable the user identity to input his or her credential. An input device can comprise, for example, a camera for taking a picture of the user identity. An input device can be biometric reader that receives a biometric credential. The biometric reader can comprise a fingerprint reader for obtaining a fingerprint scan. The biometric reader can comprise a microphone for obtaining a voice print. The biometric reader can comprise a retinal scanner for obtaining a retinal scan. The biometric reader can comprise an iris scanner for obtaining an iris image. The biometric can be a hand geometry reader for obtaining a hand geometry measurement. After obtaining the credential (or credentials), the user premises device 230 can transmit the credential to the authentication server 210 for processing. As mentioned above, the user input device can be integrated with the user premises device, or it may be peripherally connected to the user premises device (e.g., wired or wirelessly). For example, the user premises device can control a home security system comprising cameras located throughout the premises. The user identity can use a camera located in, for example, a bedroom, to take a picture of the user identity, whereas the user premises device 230 might be located in a room adjacent to that bedroom FIG. 3 depicts a diagram 300 showing example transactions between various devices described in the example system of FIG. 2. At transaction 1, "Registration and Setup," a server 120 that provides an on-line system providing a service or product (in this example, the "My Business App" website), can be registered and set up to interact with authentication server 210, such that the on-line system can be operable to receive an authentication verification from the authentication server 210, and grant access to a user identity based on the receipt of the authentication verification.

Figure 7:
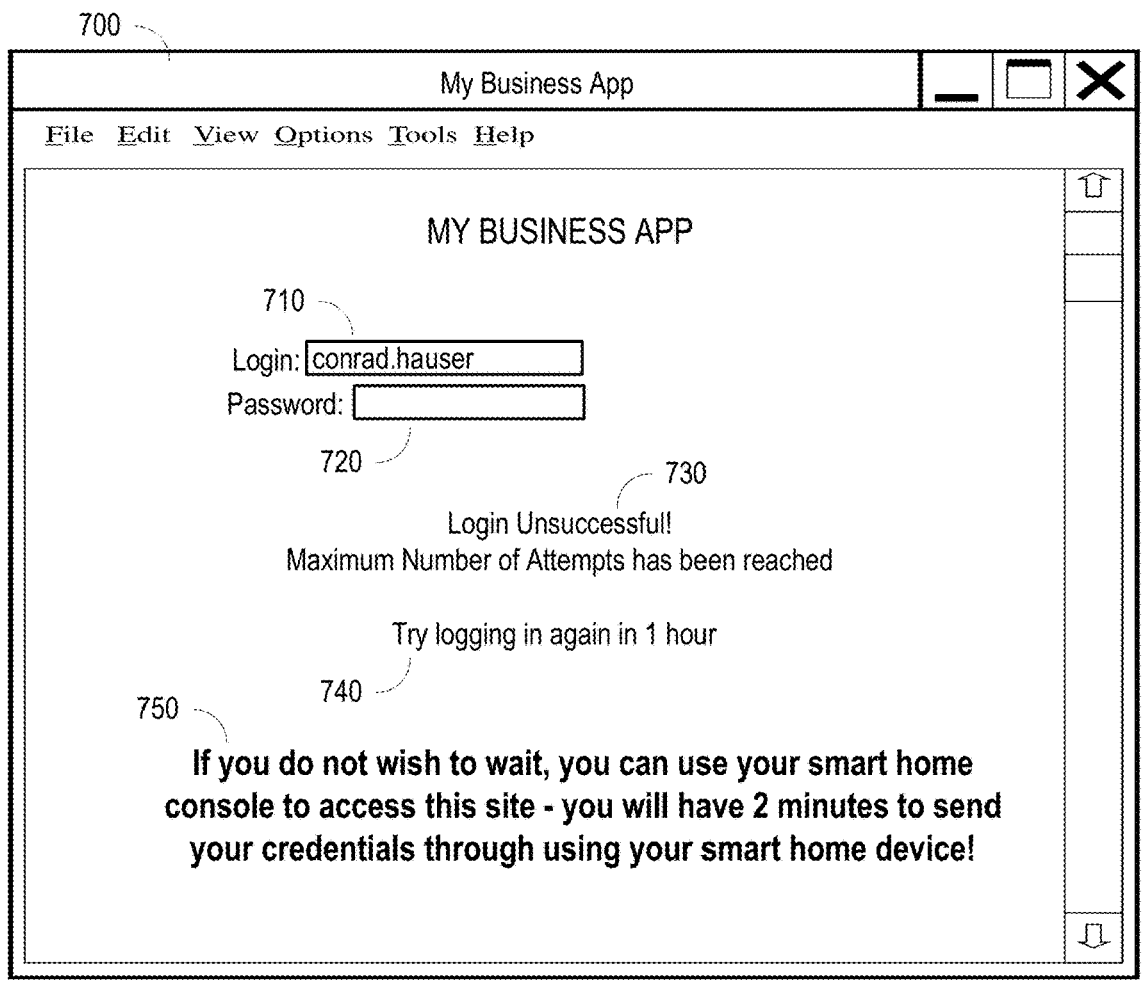
FIG. 7 illustrates an example graphical user interface (GUI) of a login screen in which access to an on-line system has been denied.

Referring to FIG. 3, at transaction 2, "Access locked," the server 120 through a website (e.g., the My Business App website), can generate for display a message on the display of a user identity's user equipment (e.g., UE 140) that informs the user identity that he or she can use their smart home device (e.g., user premises device 230) to access the website. The server 120 can generate this message in response to, for example, the user's access being denied for a certain period based on repeated unsuccessful attempts to login using the user's login (e.g., username). An example user interface can be as shown in FIG. 7. In example embodiments, after the user identity has input his or her username and received the message indicating that he or she has been locked out, the on-line system can be operative to set a timer, wherein the user identity has a set amount of time in which to submit his or her authentication credentials through the user premises device 230. If the time expires, then the on-line system prevents the user identity from accessing the system, unless he or she submits his or her username at the login prompt again.

Figure 8:
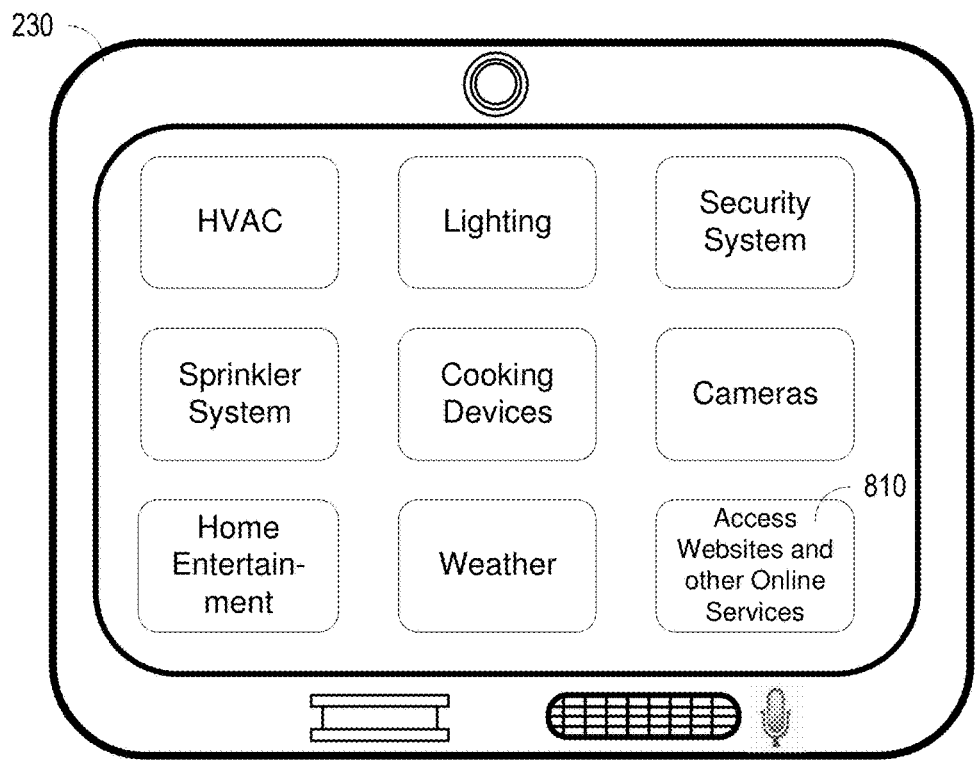
FIGS. 8-9 illustrate an example user premises device generating displays in accordance with various aspects and embodiments of the subject disclosure.
Figure 9:
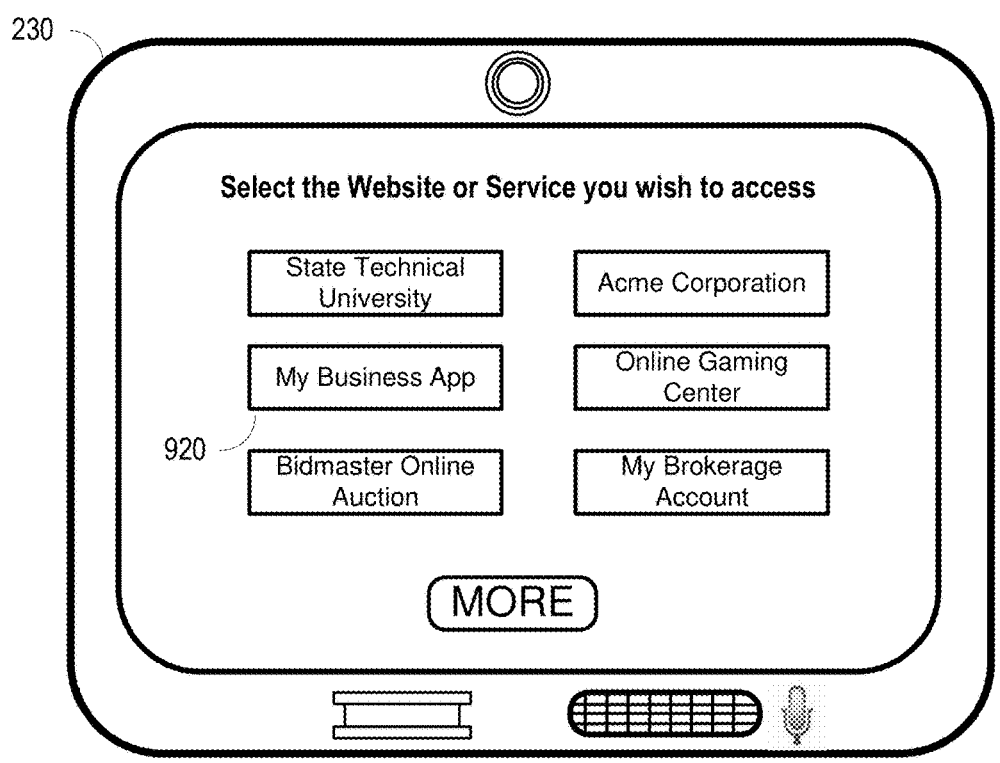

In example implementations, at transaction 3, "Select service to unlock," the user identity can, from the user premises device 230, select a service that the user wishes to access from the user premises device 230, with the user premises device 230 displaying a list of websites (or other on-line services) that the user can access with his or her user premises device 230. The user identity can select a computer-generated button displayed on the user premises device 230 to select a particular service (e.g., select a button corresponding to "My Business App."). Examples of a user interface of a user premise device 230 displaying these features are shown in FIGS. 8 and 9.

Still on FIG. 3, once the user identity has selected the service that he or she wishes to access, the user premises device 230 can at transaction 4, "Prompt for credentials," generate on the display of the user premises device 230 a prompt for the user identity to authenticate the user identity's access to the on-line system.

The user identity, at transaction 5, "Input credentials," can input credentials related to one or more physical qualities of the user identity (e.g., a picture of the user identity, a fingerprint, or a voice recording/print). The credentials can be input through one or more input devices associated with the user premises device (e.g., a camera, a finger print reader, a microphone, etc.). The user premises device 230 can be operable to reduce the likelihood of spoofing (for example, so that a still picture of the user identity by an unauthorized user is not accepted, or voice recording of the user identity is not accepted). For example, a user can be prompted (either threw on-screen prompts or through the user premises device 230's speakers) to submit a fingerprint credential via the fingerprint reader (which can have liveness detection mechanisms such checking for temperature, pulse, blood flow, oxygen level, etc.) while also taking a picture, or speaking into a microphone. To reduce the likelihood that a still photo is being used, the user premises device 230 can be operable to prompt the user identity to blink his or her eye when capturing multiple pictures of the user identity, and then can be operable to analyze the pictures to determine whether the user has blinked. The user premises device 230 can also be operable to prompt the user to speak out a certain sequence of words, numerals, or combination thereof, when recording a voice print. The voice print can be analyzed to determine whether the prompted-for sequence was spoken by the user identity.

Once the user's credentials have been obtained, then at transaction 6, "Submit unlock request and credentials," a request for access to the on-line system, the credential (or credentials), and information identifying the user identity (e.g., the user identity's username for accessing the on-line system, for example), can be sent to the authentication server 210.

At transaction 7, "Verify identity," the authentication server 210 can compare the credential submitted with a credential previously submitted by the user identity (e.g., obtained from a memory accessible to the authentication server 210, wherein the credential obtained from the memory (e.g., data store 220) was obtained prior to the receipt of the subsequently submitted credential). In example embodiments, the user identity can submit one or more credentials for later comparison of submitted credentials, for example, during a set-up of the user premises device 230, or at any point subsequent to the set-up.

Still referring to FIG. 3, at transaction 8, "Unlock," in response to the submitted credential being determined to match the previously stored credential, the authentication server 210 can transmit an authentication verification to the second system for usage in enabling the access to the on-line system (e.g., My Business App, in this example). The server 120 of the on-line system, after receiving the authentication request, can, for example, unlock the user's account, and log the user identity in at the user equipment (e.g., UE 140) that the user identity used to attempt to access the on-line system in the first place.

Figure 4:
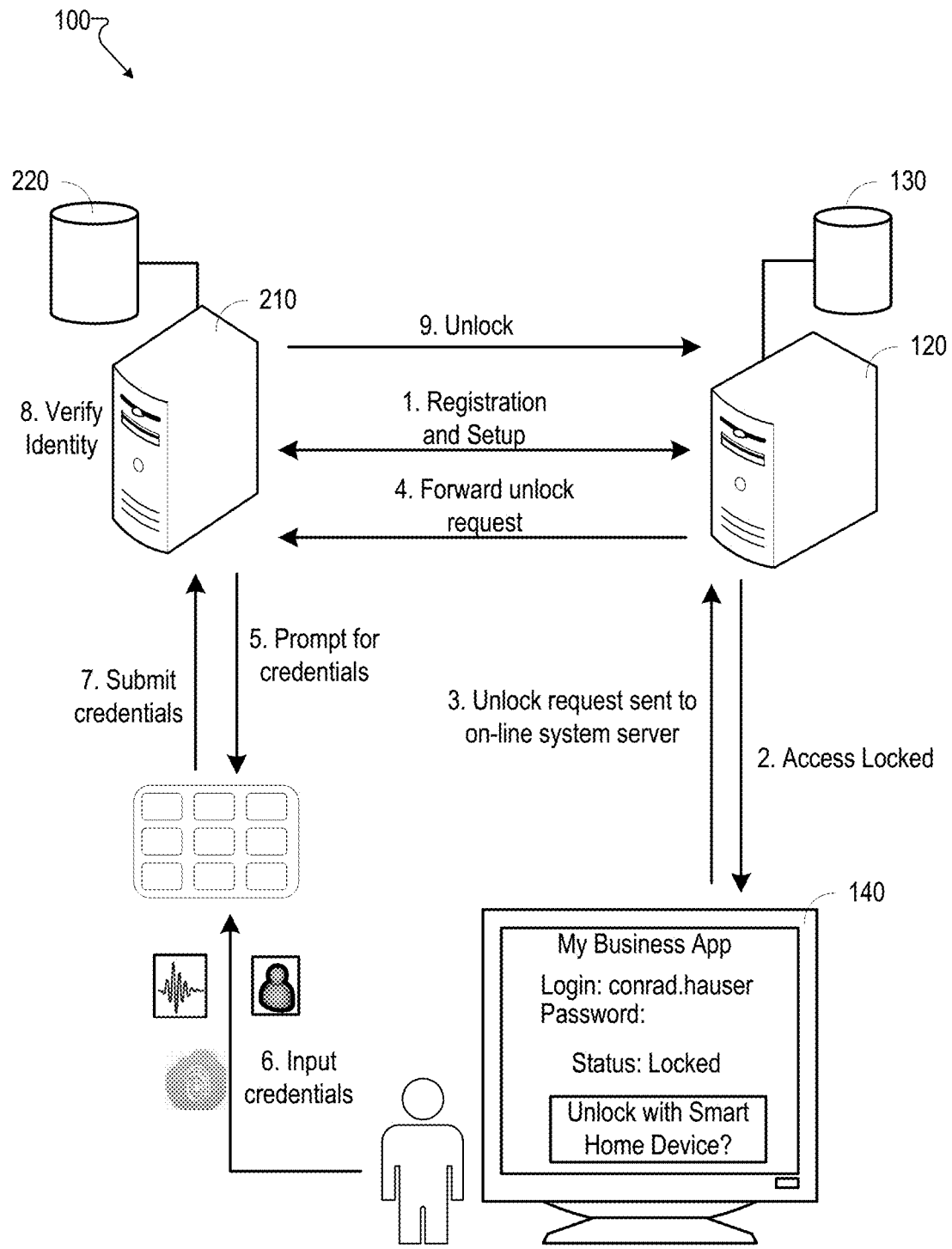

FIG. 4 is another example embodiment wherein a user premises device 230 can be used to submit credentials related to a physical quality of the user identity, to gain access to an on-line system.

Transaction 1, "Registration and Setup," can be similar as described in FIG. 3, wherein the server for services (or products) can be configured to interact with a user equipment (e.g., UE 140) and an authentication server (e.g., authentication server 210). At transaction 2, "Access locked," the server 120 through a website (e.g., the My Business App website), can generate for display a button for the user to initiate the process by which access can be gained using the user premises device 230 (e.g., a button labeled "unlock with smart home device?"). An example of an interface that displays such a button can be as shown in FIG. 12. The server 120 can generate this selectable button in response to, for example, the user's access being denied for a certain period based on repeated unsuccessful attempts to login using the user's login (e.g., username) In example embodiments, after the user identity has selected the button to initiate the authentication process, the on-line system can be operative to set a timer, wherein the user identity has a set amount of time in which to submit his or her authentication credentials through the user premises device 230. If the time expires, then the on-line system prevents the user identity from accessing the system, unless he or she submits his or her username at the login prompt again.

In example embodiments, at transaction 3, "Unlock request sent to on-line system server," in response to the user identity choosing to unlock access with the user premises device, the user equipment 140 can send the request to the on-line system's server 120.

Referring to FIG. 4, at transaction 4, "Forward unlock request," the server 120 can forward the request for access to authentication server 210. The request can also comprise information to identify the user identity (e.g., the username of the user identity used to access the on-line system), and the on-line system that the user identity wishes to access.

At transaction 5, "Prompt for credentials," the authentication server, can send a signal to the user premises device associated with the user identity. Upon receipt of this signal, the user premise device can generate on the display of the user premises device 230 a prompt for the user identity to authenticate the user identity's access to the on-line system (e.g., the website "My Business App" in this example).

The user identity, at transaction 6, "Input credentials," can input credentials related to one or more physical qualities of the user identity (e.g., a picture of the user identity, a fingerprint, or a voice recording/print). The credentials can be input through one or more input devices associated with the user premises device (e.g., a camera, a finger print reader, a microphone, etc.).

Once the user's credentials and have been obtained, then at transaction 7, "Submit credentials," the credential (or credentials) can be submitted to the authentication server 210, along with information identifying the user identity (e.g., the user identity's username for accessing the on-line system, for example).

At transaction 8, "Verify identity," the authentication server 210 can compare the credential submitted with a credential previously submitted by the user identity (e.g., obtained from a memory accessible to the authentication server 210, wherein the credential obtained from the memory (e.g., data store 220) was obtained prior to the receipt of the subsequently submitted credential). In example embodiments, the user identity can submit one or more credentials for later comparison of submitted credentials, for example, during a set-up of the user premises device 230, or at any point subsequent to the set-up.

Still referring to FIG. 4, at transaction 9, "Unlock," in response to the submitted credential being determined to match the previously stored credential, the authentication server 210 can transmit an authentication verification to the second system for usage in enabling the access to the on-line system (e.g., My Business App, in this example). The server 120 of the on-line system, after receiving the authentication request, can, for example, unlock the user's account, and log the user identity in at the user equipment (e.g., UE 140) that the user identity used to attempt to access the on-line system in the first place.

In some example embodiments, the message indicating to the user identity that the user identity can use his or her use premises device (e.g., user premises device 230) to access an on-line system can be displayed, regardless of whether the user account has been locked, thus allowing the user to access the on-line system using the user premises device 230, instead of logging in with a username and password.

Figure 5:
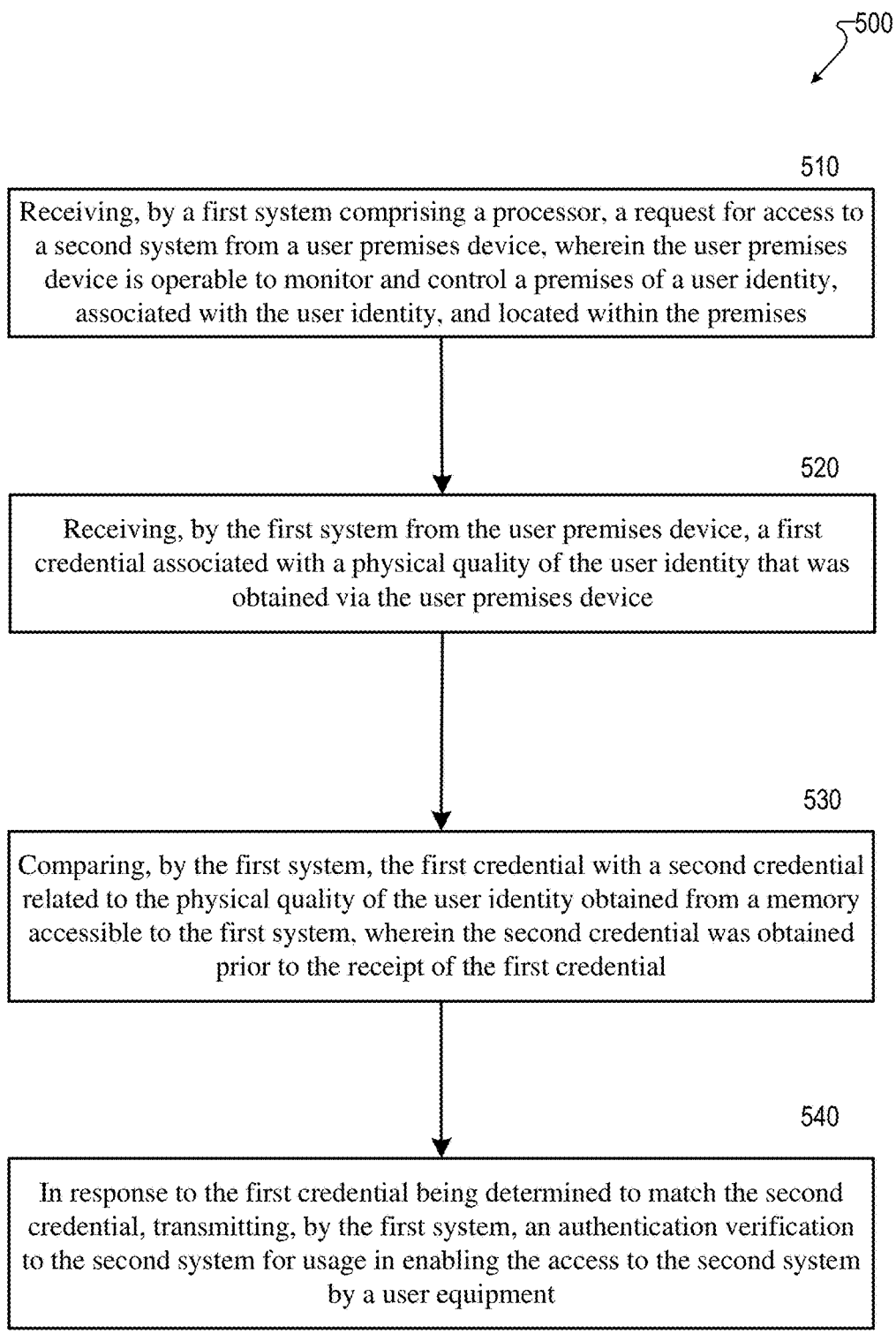
FIGS. 5-6 illustrate authentication methods that can be performed by an authentication system in accordance with various aspects and embodiments of the subject disclosure.

In non-limiting embodiments, a system (e.g., authentication server 230) is provided, comprising a processor and a memory that stores executable instructions that, when executed by the processor, facilitate performance of operations as illustrated in flow diagram 500 of FIG. 5. As shown at 510, the operations can comprise receiving, by a first system (e.g., authentication server 210) comprising a processor, a request for access to a second system (e.g., an on-line system that can be provided by server 120 that allows a user access to on-line services and products) from a user premises device (e.g., user premises device 230), wherein the user premises device is operable to monitor and control a premises of a user identity, associated with the user identity, and located within the premises. The user premises device can be operable to monitor and control, for example, a physical security network (e.g., an alarm system) of the premises, the temperature of the premises, the lighting of the premises, etc.

Still on FIG. 5, the operations can as shown at 520, further comprise receiving, by the first system from the user premises device, a first credential associated with a physical quality of the user identity that was obtained through the user premises device. The credential can be, for example, a fingerprint, a picture of the user identity, a voice recording (e.g., voice print) of the user identity, a retinal scan, an iris image, a hand geometry measurement, etc.

As shown in FIG. 5 at 530, the operations can further comprise comparing, by the first system, the first credential with a second credential related to the physical quality of the user identity obtained from a memory accessible to the first system, wherein the second credential was obtained prior to the receipt of the first credential (e.g., comparing a fingerprint of the user identity to a fingerprint that was previously obtained and stored in a data store).

Also in FIG. 5 at 540, the operations can further comprise, in response to the first credential being determined to match the second credential, transmitting, by the first system, an authentication verification to the second system for usage in enabling the access to the second system by a user equipment (e.g., UE 140).

Figure 6:
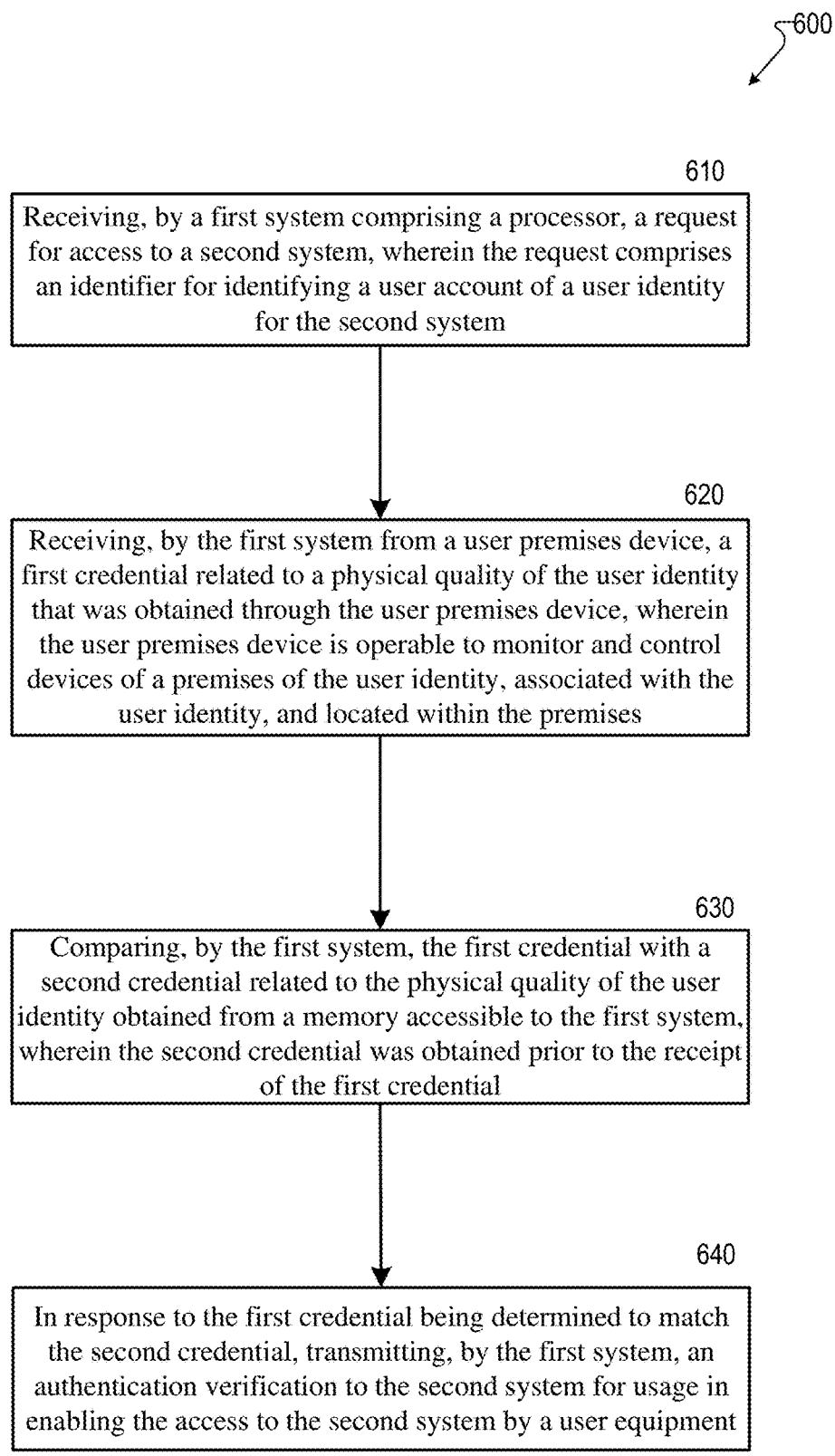

In another non-limiting embodiment, a system (e.g., authentication server 230) is provided, comprising a processor and a memory that stores executable instructions that, when executed by the processor, facilitate performance of operations as illustrated in flow diagram 600 of FIG. 6.

As shown at 610, the operations can comprise receiving by a first system (e.g., authentication server 230) comprising a processor, a request for access to a second system (e.g., an on-line system that can be provided by server 120 that allows a user access to on-line services and products), wherein the request comprises an identifier for identifying a user account of a user identity for the second system.

In FIG. 6, at 620, the operations can comprise receiving, by the first system from a user premises device, a first credential related to a physical quality of the user identity (e.g., fingerprint, picture, voice print, retinal scan, iris image, hand geometry, etc.) that was obtained through the user premises device, wherein the user premises device is operable to monitor and control a premises of the user identity (e.g., monitor and control devices of the premises, such as an IoT light in the premises, a security camera of a physical security network of the premises, a thermostat of the premises, etc.), is associated with the user identity, and is located within the premises.

As shown in 630, the operations can comprise comparing, by the first system, the first credential with a second credential related to the physical quality of the user identity obtained from a memory accessible to the first system, wherein the second credential was obtained prior to the receipt of the first credential (e.g., comparing a fingerprint of the user identity to a fingerprint that was previously obtained and stored in a data store).

At 640, the operations can comprise, in response to the first credential being determined to match the second credential, transmitting, by the first system, an authentication verification to the second system for usage in enabling the access to the second system by a user equipment (e.g., UE 140).

FIG. 7 illustrates an example of a GUI (e.g., a web page, a web dialog, etc.) showing a login page for an on-line system that can be generated by a user equipment (e.g., UE 140) in response to a server (e.g., server 130). In this example, the on-line system, which can be a system that provides on-line services or goods, is labeled "My Business App." The login page to this on-line system can display a login field 710 for entering a user identity's username, and a password field 720 for entering the user identity's password. As shown in FIG. 7, the webpage displays a message 730 to the user identity indicating that the user identity's attempt to access the on-line system is unsuccessful because the maximum number of attempts to login has been reached. The server 120 can generate this message in response to, for example, the user's access being denied for a certain period based on repeated unsuccessful attempts to login using the user's login (e.g., username). The webpage can also display text 740 indicating that the user identity can try to log in again after one hour has elapsed. In accordance with the present application, text 750 can inform the user identity that he or she can use their smart home device (e.g., user premises device 230) to access the website if they do not wish to wait until later to log in. In example embodiments, after the user identity has input his or her username and received the message indicating that he or she has been locked out, the on-line system can be operative to set a timer, wherein the user identity has a set amount of time in which to submit his or her authentication credentials through the user premises device 230. If the time expires, then the on-line system prevents the user identity from accessing the system, unless he or she submits his or her username at the login prompt again.

FIG. 8 and FIG. 9 depict a user premises device 230 having a GUI. The user premises device can be operable to monitor and control a premises of a user identity, can be associated with the user identity, and can be located within the premises (e.g., secured by physical and electronic security measures). If the user identity encounters the GUI shown in FIG. 7 and chooses to login from a user premises device 230 (e.g., smart home device), the user premises device 230 can present a GUI as shown in FIG. 8. The GUI shows multiple selectable buttons for a user to click on to monitor and control the user's premises (e.g., temperature, lighting, security system, sprinkler system, etc.). The user identity can also, from this GUI of the user premises device 230, select a service that the user wishes to access from the user premises device 230 by selecting, for example, a "Access Websites and other On-line services" button 810, which would lead the user premises device 230 to display a list of websites (or other on-line services), as shown in FIG. 9, that the user can access through his or her user premises device 230. The user identity can select a button displayed on the user premises device 230 to select a particular service (e.g., select a button corresponding to "My Business App" 920) that the user desires to access.

FIG. 10 depicts a GUI generated by the user premises device 230 that can be presented to a user identity in response selection to access a particular service. The user premises device can generate a prompt 1010 informing the user identity to input a credential (or, in this example, credentials) to gain access to the on-line system (e.g., a prompt such as "Authenticate your credentials for access to the website MyBusinessApp.com"). The user premises device can comprise one or more input devices for obtaining the credential or credentials (e.g., a camera 1020 for obtaining a photograph, a fingerprint reader 1030 for obtaining fingerprints, a microphone 1040 for obtaining a voice print). The one or more input devices can be physically integrated with the user premise device (as shown in FIG. 10), or can be peripherally connected to the user premises device (e.g., wired or wirelessly).

Figure 11:
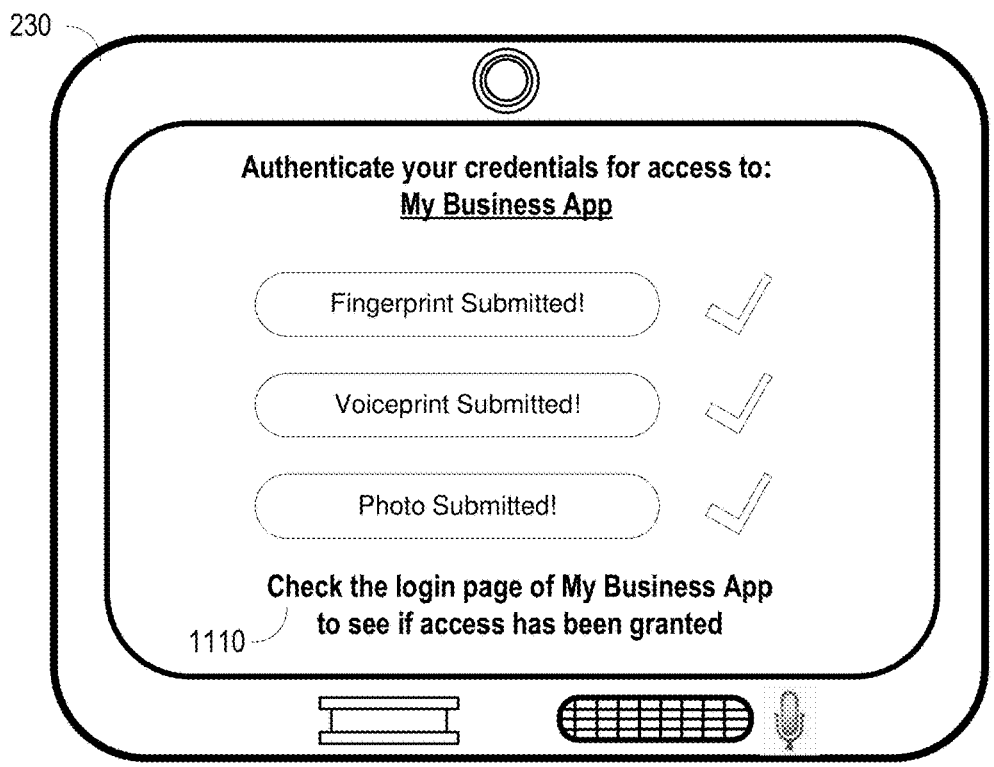

As shown in FIG. 11, after a user identity has input the credential (or credentials), the user premises device 230 can display on-screen text indicating to the user identity that his or her credential submissions have been successful. After submission, the user premises device 230 can transmit the credentials to an authentication system (e.g., provided through authentication server 210). The authentication system can receive the credential and compare this credential with a credential related to the quality of the user identity obtained from a memory accessible by the authentication system (e.g., compare the fingerprint of the user identity received from the user premises device with a fingerprint of the user identity obtained from memory), wherein the credential stored in the memory was obtained prior to the receipt of the credential subsequently obtained from the user premises device). In response to the credential being determined to match the credential previously obtained and stored in memory, the authentication system can transmit an authentication verification to the on-line system, which, upon receipt and processing, can enable access to the on-line system by the user through a user equipment (e.g., a personal computer). As shown in FIG. 11, the user premises device 230 can display a message 1110 informing the user identity to check the login page of the on-line system that the user identity was attempting to access (e.g., in this example, "Check the login page of My Business App to see if access has been granted").

FIG. 12 shows GUI 1200 that is similar to the GUI shown in FIG. 7. In this example embodiment, however, a GUI button 1210 can be displayed to the user asking the user to submit the request (e.g., a button displaying the caption, "Or click here to use your smart home device to unlock your account."). Once a request has been transmitted (e.g., after the button has been selected), the on-line system can be operable to forward the user request for access to the on-line system (e.g., My Business App in this example) to an authentication system. The user request can comprise information identifying the user account of the on-line system.

Figure 13:
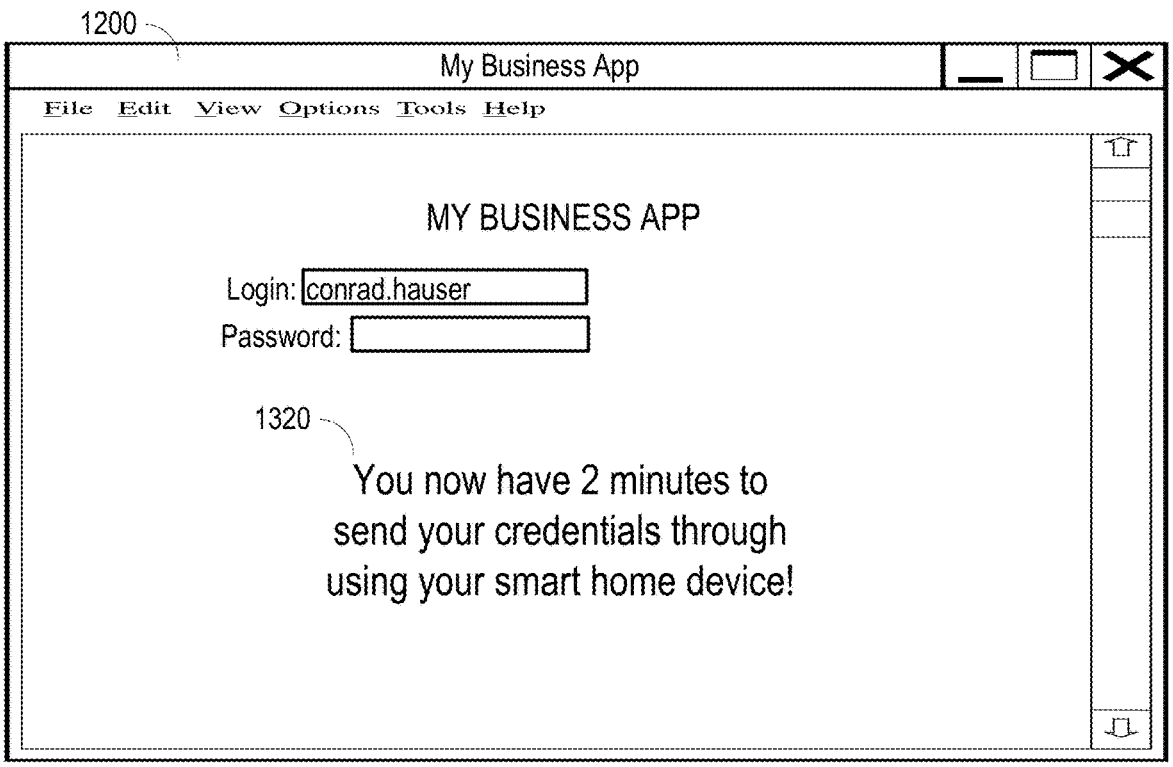

As shown in FIG. 13, after the GUI button 1210, the on-line system can be operative to set a timer, wherein the user identity has a specific amount of time in which to submit his or her authentication credentials through the user premises device 230. If the time expires, then the on-line system prevents the user identity from accessing the system, unless he or she submits his or her username at the login prompt again. The user premises device 230 can display an indication 1320 of this to the user.

In example embodiments, the user systems and methods described herein can also be used to help automate and secure some tasks. For example, they can be used to send health test results (or monitoring data) to a hospital on a regular basis, wherein patient actions might not be used for transmission or access to a hospital or lab. In example embodiments, the user premises device can be used to authenticate a user identity, who is on his or her premises and takes a medically related test on medical devices, and provide authentication that the tests are from the user identity when submitting the test results to the hospital or lab.

Figure 14:
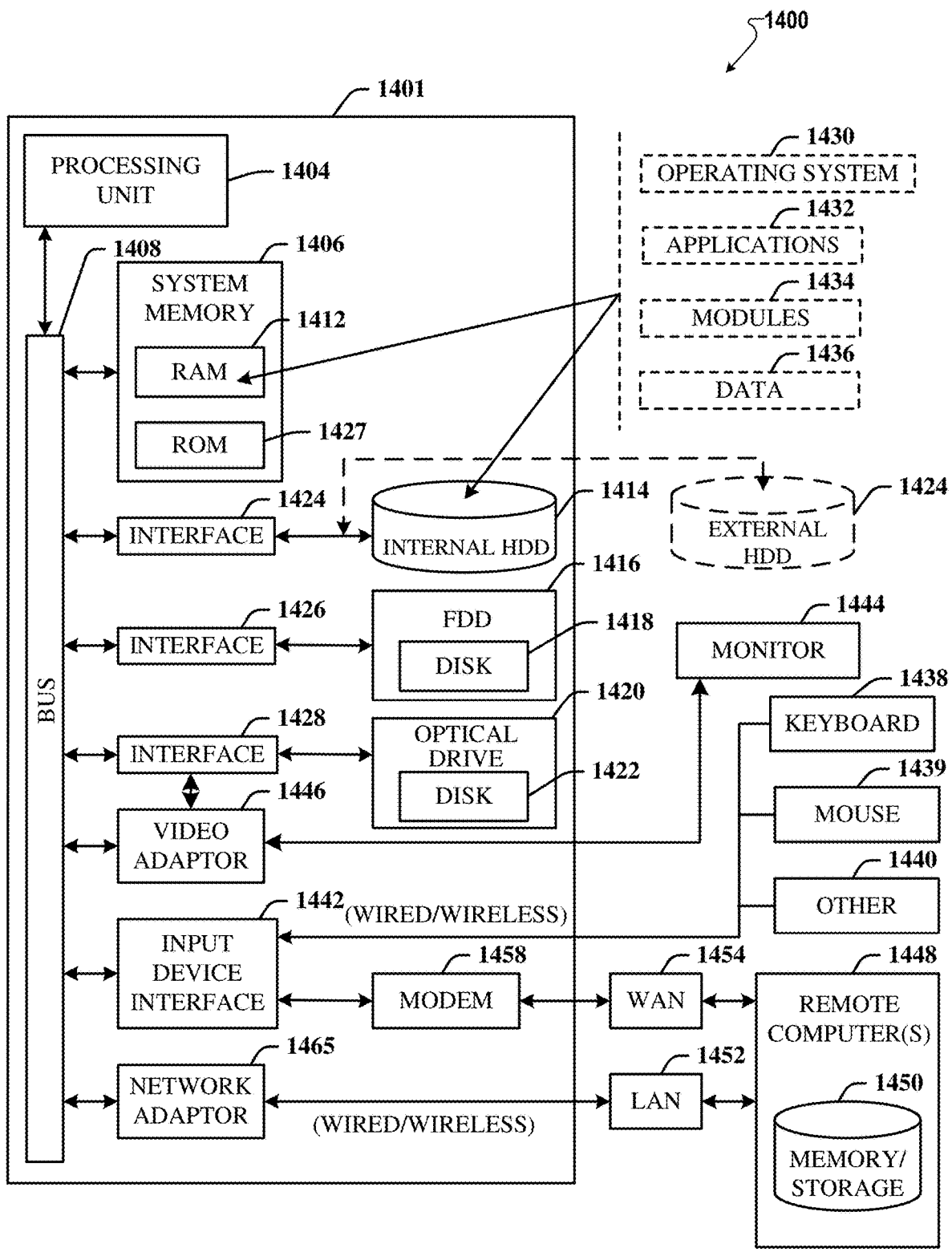
FIG. 14 illustrates an example block diagram of a computer that can be operable to execute processes and methods in accordance with various aspects and embodiments of the subject disclosure.

Referring now to FIG. 14, there is illustrated a block diagram of a computer 1400 operable to execute the functions and operations performed in the described example embodiments. For example, a user device (e.g., UE 140) or servers (e.g., servers 120) can contain components as described in FIG. 14. The computer 1400 can provide networking and communication capabilities between a wired or wireless communication network and a server and/or communication device. In order to provide additional context for various aspects thereof, FIG. 14 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory data stores.

Computing devices typically include a variety of media, which can include computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 14, implementing various aspects described herein with regards to the servers (e.g., server 120, authentication server 210), UEs (e.g., UE 140), and user premises devices (e.g., user premise device 230) can comprise a computer 1400, the computer 1400 comprising a processing unit 1404, a system memory 1406 and a system bus 1408. The system bus 1408 couples system components comprising the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 comprises read-only memory (ROM) 1427 and random access memory (RAM) 1412. A basic input/output system (BIOS) is stored in a non-volatile memory 1427 such as ROM, EPROM, EEPROM, which BIOS contains the basic routines that help to transfer information between elements within the computer 1400, such as during start-up. The RAM 1412 can also include a high-speed RAM such as static RAM for caching data.

The computer 1400 further comprises an internal hard disk drive (HDD) 1414 (e.g., EIDE, SATA), which internal hard disk drive 1414 can also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive 1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations comprises at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1400 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1400, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 1412, comprising an operating system 1430, one or more application programs 1432, other program modules 1434 and program data 1436. All or portions of the operating system, applications, modules, and/or data can also be cached in the RAM 1412. It is to be appreciated that the innovation can be implemented with various commercially available operating systems or combinations of operating systems.

A user can enter commands and information into the computer 1400 through one or more wired/wireless input devices, e.g., a keyboard 1438 and a pointing device, such as a mouse 1439. Other input devices 1440 (not shown) can include a microphone, camera, an IR remote control, a joystick, a game pad, a stylus pen, touch screen, biometric reader (e.g., fingerprint reader, retinal scanner, iris scanner, hand geometry reader, etc.), or the like. These and other input devices are often connected to the processing unit 1404 through an input device interface 1442 that is coupled to the system bus 1408, but can be connected by other interfaces, such as a parallel port, an IEEE 2394 serial port, a game port, a USB port, an IR interface, etc.

A monitor 1444 or other type of display device can also be connected to the system bus 1408 through an interface, such as a video adapter 1446. In addition to the monitor 1444, a computer 1400 typically comprises other peripheral output devices (not shown), such as speakers, printers, etc.

The computer 1400 can operate in a networked environment using logical connections by wired and/or wireless communications to one or more remote computers, such as a remote computer(s) 1448. The remote computer(s) 1448 can be a workstation, a server computer, a router, a personal computer, portable computer, microprocessor-based entertainment device, a peer device or other common network node, and typically comprises many or all of the elements described relative to the computer, although, for purposes of brevity, only a memory/data store 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which can connect to a global communications network, e.g., the Internet.

When used in a LAN networking environment, the computer 1400 is connected to the local network 1452 through a wired and/or wireless communication network interface or adapter 1456. The adapter 1456 can facilitate wired or wireless communication to the LAN 1452, which can also include a wireless access point disposed thereon for communicating with the wireless adapter 1456.

When used in a WAN networking environment, the computer 1400 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 through the input device interface 1442. In a networked environment, program modules depicted relative to the computer, or portions thereof, can be stored in the remote memory/data store 1450. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 15:
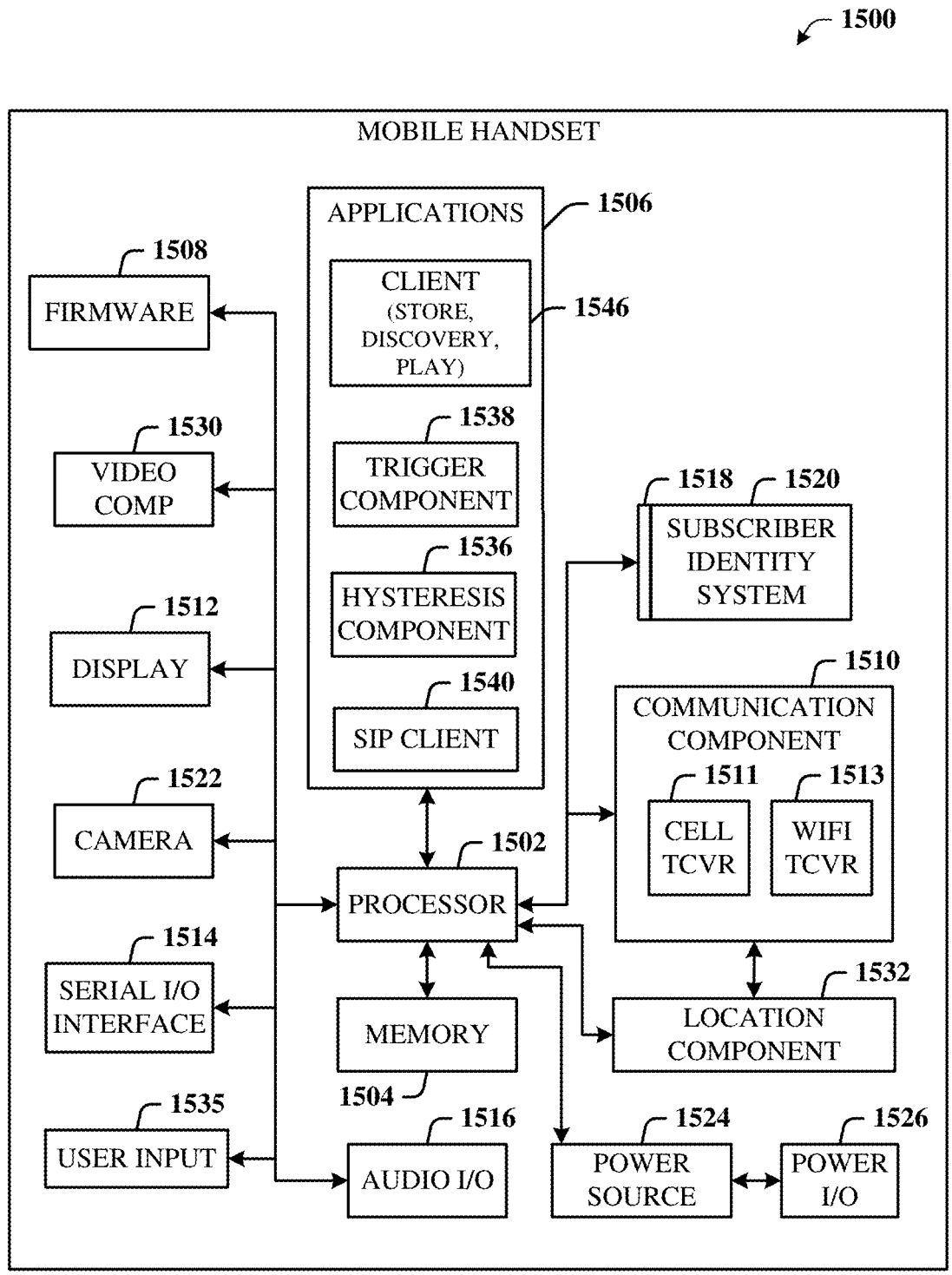
FIG. 15 illustrates an example block diagram of a mobile handset that can be operable to execute processes and methods in accordance with various aspects and embodiments of the subject disclosure.

Referring now to FIG. 15, illustrated is a schematic block diagram of a mobile device 1500 (which can be, for example, UE 140, or in some example embodiments, user premises device 230) capable of connecting to a network in accordance with some embodiments described herein. Although a mobile handset 1500 is illustrated herein, it will be understood that other devices can be a mobile device, and that the mobile handset 1500 is merely illustrated to provide context for the embodiments of the various embodiments described herein. The following discussion is intended to provide a brief, general description of an example of a suitable environment 1500 in which the various embodiments can be implemented. While the description comprises a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, comprising single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and comprises both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic data stores, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

The handset 1500 comprises a processor 1502 for controlling and processing all onboard operations and functions. A memory 1504 interfaces to the processor 1502 for storage of data and one or more applications 1506 (e.g., a video player software, user feedback component software, etc.). Other applications can include voice recognition of predetermined voice commands that facilitate initiation of the user feedback signals. The applications 1506 can be stored in the memory 1504 and/or in a firmware 1508, and executed by the processor 1502 from either or both the memory 1504 or/and the firmware 1508. The firmware 1508 can also store startup code for execution in initializing the handset 1500. A communications component 1510 interfaces to the processor 1502 to facilitate wired/wireless communication with external systems, e.g., cellular networks, VoIP networks, and so on. Here, the communications component 1510 can also include a suitable cellular transceiver 1511 (e.g., a GSM transceiver) and/or an unlicensed transceiver 1513 (e.g., Wi-Fi, WiMax) for corresponding signal communications. The handset 1500 can be a device such as a cellular telephone, a PDA with mobile communications capabilities, and messaging-centric devices. The communications component 1510 also facilitates communications reception from terrestrial radio networks (e.g., broadcast), digital satellite radio networks, and Internet-based radio services networks.

The handset 1500 comprises a display 1512 for displaying text, images, video, telephony functions (e.g., a Caller ID function), setup functions, and for user input. For example, the display 1512 can also be referred to as a "screen" that can accommodate the presentation of multimedia content (e.g., music metadata, messages, wallpaper, graphics, etc.). The display 1512 can also display videos and can facilitate the generation, editing and sharing of video quotes. A serial I/O interface 1514 is provided in communication with the processor 1502 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1500, for example. Audio capabilities are provided with an audio I/O component 1516, which can include a speaker for the output of audio signals related to, for example, indication that the user pressed the proper key or key combination to initiate the user feedback signal. The audio I/O component 1516 also facilitates the input of audio signals through a microphone to record data and/or telephony voice data, and for inputting voice signals for telephone conversations.

The handset 1500 can include a slot interface 1518 for accommodating a SIC (Subscriber Identity Component) in the form factor of a card Subscriber Identity Module (SIM) or universal SIM 1520, and interfacing the SIM card 1520 with the processor 1502. However, it is to be appreciated that the SIM card 1520 can be manufactured into the handset 1500, and updated by downloading data and software.

The handset 1500 can process IP data traffic through the communication component 1510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 1522 (e.g., a camera) can be provided for decoding encoded multimedia content. The video processing component 1522 can aid in facilitating the generation, editing and sharing of video quotes. The handset 1500 also comprises a power source 1524 in the form of batteries and/or an AC power subsystem, which power source 1524 can interface to an external power system or charging equipment (not shown) by a power I/O component 1526.

The handset 1500 can also include a video component 1530 for processing video content received and, for recording and transmitting video content. For example, the video component 1530 can facilitate the generation, editing and sharing of video quotes. A location tracking component 1532 facilitates geographically locating the handset 1500. As described hereinabove, this can occur when the user initiates the feedback signal automatically or manually. A user input component 1534 facilitates the user initiating the quality feedback signal. The user input component 1534 can also facilitate the generation, editing and sharing of video quotes. The user input component 1534 can include such conventional input device technologies such as a keypad, keyboard, mouse, stylus pen, and/or touch screen, for example.

Referring again to the applications 1506, a hysteresis component 1536 facilitates the analysis and processing of hysteresis data, which is utilized to determine when to associate with the access point. A software trigger component 1538 can be provided that facilitates triggering of the hysteresis component 1538 when the Wi-Fi transceiver 1513 detects the beacon of the access point. A SIP client 1540 enables the handset 1500 to support SIP protocols and register the subscriber with the SIP registrar server. The applications 1506 can also include a client 1542 that provides at least the capability of discovery, play and store of multimedia content, for example, music.

The handset 1500, as indicated above related to the communications component 1510, comprises an indoor network radio transceiver 1513 (e.g., Wi-Fi transceiver). This function supports the indoor radio link, such as IEEE 802.11, for the dual-mode GSM handset 1500. The handset 1500 can accommodate at least satellite radio services through a handset that can combine wireless voice and digital radio chipsets into a single handheld device.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. These components also can execute from various computer readable storage media comprising various data structures stored thereon. The components can communicate via local and/or remote processes such as in accordance with a signal comprising one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic data store, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a data store and/or any of the above computer-readable media.

As it employed in the subject specification, the term "processor" can refer to substantially any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of UE. A processor also can be implemented as a combination of computing processing units.

In the subject specification, terms such as "store," "data store," "data storage," "database," "repository," "queue", "storage device," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (comprising a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium comprising computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic data stores, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," "station," "access terminal," "terminal," "handset," and similar terminology, can generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary," where used, is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature can be combined with one or more other features of the other implementations as may be desired and advantageous for any given or particular application. Furthermore, to the extent that the terms "have", "having", "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art can recognize that other embodiments comprising modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A method, comprising:
   receiving, by a first system comprising a processor, an unlock request that was transmitted by a second system in response to a condition in which a user identity has been denied access to the second system for a period based on repeated unsuccessful attempts to access the second system using a login associated with the user identity;
   based on receipt of the unlock request, sending, by the first system, a prompt for a credential displayed on a user premises equipment located within a premises associated with the user identity, wherein:
      the user premises equipment performs monitoring and controlling of the premises, and the second system provides a service that is unrelated to the monitoring and the controlling of the premises;
generating, by the first system, a time duration for the credential to be input into the user premises equipment;
receiving, by the first system from the user premises equipment, the credential that was input into the user premises equipment within the time duration;
comparing, by the first system, the credential with a stored credential obtained prior to receipt of the credential; and
in response to the credential being determined to match the stored credential, transmitting, by the first system, an authentication verification to the second system enabling the access to the second system.

2. The method of claim 1, wherein the user premises equipment monitors and controls a lighting equipment in the premises.

3. The method of claim 1, wherein the user premises equipment monitors and controls a parameter of a security equipment of a physical security network of the premises.

4. The method of claim 1, wherein the user premises equipment monitors and controls a temperature in the premises.

5. The method of claim 1, wherein the credential comprises a picture associated with the user identity, and wherein the picture is taken by a camera associated with the user premises equipment.

6. The method of claim 1, wherein the credential comprises a biometric credential associated with the user identity, and wherein the biometric credential is input via a biometric reader associated with the user premises equipment.

7. The method of claim 6, wherein the biometric credential comprises a fingerprint relating to a finger associated with the user identity, and wherein the biometric reader comprises a fingerprint reader.

8. The method of claim 6, wherein the biometric credential comprises a voice print relating to speech associated with the user identity, and wherein the biometric reader comprises a microphone.

9. The method of claim 6, wherein the biometric credential comprises a retinal scan relating to an eye associated with the user identity, and wherein the biometric reader comprises a retinal scanner.

10. The method of claim 6, wherein the biometric credential comprises an iris image relating to an eye associated with the user identity, and wherein the biometric reader comprises an iris scanner.

11. The method of claim 6, wherein the biometric credential comprises a hand geometry measurement relating to a hand associated with the user identity, and wherein the biometric reader comprises a hand geometry reader.

12. A system, comprising:
a processor; and
a memory that stores executable instructions that, when executed by the processor, facilitate performance of operations, comprising:
receiving an unlock request from a server that facilitates provision of a service, wherein the unlock request was generated by the server in response to a user identity being denied access to the service for a period due to repeated unsuccessful attempts to access the service using a login associated with the user identity;
generating a time duration for a first credential to be input into user premises equipment;
receiving, from the server, the first credential related to the user identity that was obtained via the user premises equipment, wherein:
the user premises equipment is used for monitor and control of equipment of a premises associated with, and accessible using, the user identity, and is located within the premises, and
the service is unrelated to the monitor and the control of the equipment devices;
comparing the first credential with a second credential of the user identity obtained from a memory accessible to the server, wherein the second credential was obtained prior to receipt of the first credential; and
in response to the first credential being determined to match the second credential within the time duration, transmitting an authentication verification to the server enabling the access to the service.

13. The system of claim 12, wherein the user premises equipment monitors and controls lighting in the premises.

14. The system of claim 12, wherein the user premises equipment monitors and controls a parameter related to a physical security of the premises.

15. The system of claim 12, wherein the user premises equipment monitors and controls a temperature in the premises.

16. The system of claim 12, wherein the first credential comprises an image related to the user identity, and wherein a camera associated with the user premises equipment captured the image.

17. The system of claim 12, wherein the first credential comprises a biometric credential was input via a biometric reader associated with the user premises equipment.

18. A non-transitory machine-readable medium, comprising executable instructions that, when executed by an identity verification system comprising a processor, facilitate performance of operations, comprising:
receiving an unlock request for access to an on-line system in response to the access being denied for a period to the on-line system based on multiple unsuccessful attempts to log in to the on-line system using a login credential associated with a user identity;
receiving a time period applicable to a first credential being determined to be input into user premises equipment;
receiving, from the user premises equipment, the first credential that was obtained via the user premises equipment, wherein the user premises equipment is located in a premises accessible using the user identity, and wherein the user premises equipment monitors and controls a device unrelated to a service that the on-line system enables;
comparing the first credential with a second credential of the user identity obtained from a memory accessible to the identity verification system, wherein the second credential was obtained prior to receipt of the first credential; and
in response to the first credential being determined to match the second credential within the time period, transmitting an authentication verification to the on-line system that facilitates the access to the on-line system.

19. The non-transitory machine-readable medium of claim 18, wherein the device unrelated to the service comprises an internet of things device.

20. The non-transitory machine-readable medium of claim 18, wherein the first credential comprises a biometric credential associated with the user identity, and wherein the first credential is received via a biometric reader of the user premises equipment that receives the biometric credential.

\* \* \* \* \*